United States Patent Office 3,010,945
Patented Nov. 28, 1961

3,010,945
POLYMERIZING VINYL CYCLIC ACETALS WITH COBALTOUS SALTS OF DICARBOXYLIC ACID HALF-ESTERS
Carol K. Ikeda, Wallingford, Pa., assignor to E. I. du Pont de Nemours and Company, Wilmington, Del., a corporation of Delaware
No Drawing. Filed May 26, 1958, Ser. No. 737,508
16 Claims. (Cl. 260—78.3)

This invention relates to a novel method of polymerizing certain vinyl cyclic acetal compounds, particularly in the form of films or coatings. It also relates to polymerizable compositions containing these compounds and to articles coated therewith.

The compounds of concern in this invention are the vinyl cyclic acetals containing a plurality of radicals having the following structural formula:

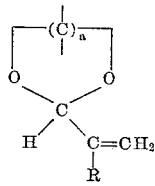

in which

represents carbon atoms in the ring, "$a$" being an integer having a value of at least 2, all but 1 (i.e. $2a-1$) of the valences of said carbon atoms being satisfied by monovalent radicals of the class consisting of hydrogen, alkyl, aryl, alkaryl, aralkyl, chloroalkyl, fluoroalkyl, alkoxyalkyl, cyano, choroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy. The unsatisfied valence of one of the carbon atoms in the chain represented by

is the valence through which the cyclic radical is connected to the remainder of the compound.

These compounds are useful as film formers for coating compositions and the like. Whenever the term "vinyl compounds," or merely "compounds," is used herein it is intended to mean the above described vinyl cyclic acetals.

Films of these compounds can be polymerized in the presence of air with the aid of commonly used paint driers (catalysts) such as cobalt linoleate and cobalt naphthenate, but only with difficulty. For example, due to the limited solubility of the ordinary catalysts in the vinyl compounds, homogeneous mixtures of the two components are difficult to prepare and the mixtures are unstable. Unpredictable amounts of catalyst settle out or precipitate, giving erratic and inconsistent results when attempting to polymerize the compound. The term "polymerize" as used herein designates the conversion of the compound in the presence of air or oxygen to a substantially tack-free or "dry" state. Most of the compounds, after conversion, are substantially insoluble in solvents which will dissolve the initial compound.

Attempts to polymerize films of the vinyl compounds with conventional driers (e.g., cobalt linoleate) have resulted in relatively slow conversion rates. Many of the specified vinyl compounds fail to become non-tacky in from 70 to 100 hours of air exposure at 75° F.

It is therefore the primary object of this invention to provide a new and improved method of polymerizing the previously described vinyl cyclic acetal compounds.

Another object is to provide compositions containing the specified compounds which will readily and consistently polymerize in the presence of air.

Other important objects will become apparent from the following description of the invention.

I have made the surprising discovery that these objects can be accomplished by using a small amount of a cobalt(ous) salt of a half ester of a dibasic acid as the polymerization catalyst or drier for the above-specified vinyl compounds. When a thin body or film of the resulting mixture is exposed to air, it polymerizes at a reproducibly rapid rate.

A better understanding of the invention will be had from the following detailed description and claims.

The catalyst used in the following examples is prepared as follows: 148 grams of phthalic anhydride and 81.4 grams of normal butyl alcohol are stirred together under nitrogen while heated at 120 to 130° C. for one hour. The 230 grams of butyl acid phthalate thus obtained is dissolved in 430 ml. of benzene. After this solution is cooled to 10° C., 40 grams of sodium hydroxide dissolved in 400 ml. of water is added with vigorous stirring, thereby converting the product to the sodium salt (sodium butyl phthalate). Next, the sodium salt is converted to the cobalt salt by dropwise addition, with stirring, of 118 grams of cobalt chloride hexahydrate dissolved in 200 ml. of water. A heterogeneous mixture is obtained, which is allowed to separate in a separatory funnel. After discarding the pink aqueous phase, the bluish purple organic phase is washed 3 times with 150 ml. portions of distilled water. The volatiles are stripped from the washed material by heating at 50 to 60° C. under reduced pressure (20–1 mm.), yielding a gummy residue. By means of a vacuum oven heated at 50 to 60° C., the residue is dried to constant weight. The product, almost pure cobalt(ous) butyl phthalate with a cobalt content of 10.85%, is suitable for use as a polymerization catalyst in practicing this invention.

The following specific examples, wherein parts and percents are by weight unless otherwise specified, are intended to illustrate the invention and not to limit it in any way.

EXAMPLE 1

Cobalt(ous) butyl phthalate as produced above is dissolved in toluene in such proportions that the solution contains 10 milligrams of cobalt metal per ml. 0.25 ml. of the resulting catalyst stock solution, after dilution with 0.5 ml. of toluene, is mixed with 5 grams of bis-(2-vinyl-1,3-dioxolane-4-butyl) orthophthalate, one of the preferred vinyl compounds. The catalyst readily disperses into the compound to produce a homogeneous mixture, with no apparent tendency to separate or precipitate. This mixture contains 0.05% cobalt metal based on the weight of the vinyl compound.

A wet film of the mixture is cast on a glass plate, using a 2.4 mil doctor knife applicator. The film is substantially tack-free and insoluble after 5 hours of exposure to air at about 75° F.

The entire procedure of this preferred embodiment is repeated several times with essentially the same results, indicating reproducibility in contrast with the lack thereof when ordinary cobalt driers are used.

Simultaneously, to provide a basis of comparison with commonly used paint catalysts, the same procedure is repeated several times with cobalt linoleate and cobalt naphthenate as driers or catalysts. Neither of these disperses readily in the vinyl ester, and both show various degrees of precipitation. The films are still wet or tacky after at least 23 hours of exposure to air. Neither catalyst gives consistent results, with film properties varying from wet and bodied to solid and tacky.

Example 1 is repeated, except the vinyl compound is mixed with sufficient of the catalyst to result in a cobalt metal content by weight of compound as shown in the following table:

|  | Percent Cobalt | Tack Free Time |
|---|---|---|
| Example 2 | 0.03 | 5.5 hours. |
| Example 3 | 0.02 | 24 hours. |
| Example 4 | 0.01 | about 75 hours. |

EXAMPLE 5

Sufficient of the catalyst stock solution of Example 1 is mixed with the vinyl compound of Example 1 to result in a cobalt metal content of 0.001% based on the weight of compound. A one mil wet film of the mixture is cast on a glass plate and baked at 100° C. for 15 minutes. An excellent clear, flexible, adherent, tack-free coating is produced.

Example 1 is repeated, except the vinyl compound used in that example is replaced with the following compounds:

Vinyl dioxolane compound

Example 6—bis(2-vinyl-1,3-dioxolane-4-butyl) azodiformate
Example 7—bis(2-vinyl-1,3-dioxolane-4-butyl) itaconate
Example 8—bis(2-vinyl-1,3-dioxolane-4-butyl) acetone dicarboxylate
Example 9—bis(2-vinyl-1,3-dioxolane-4-butyl) acetamidomalonate
Example 10—bis(2-vinyl-1,3-dioxolane-4-butyl) di(cyanoethyl)malonate
Example 11—bis(2-vinyl-1,3-dioxolane-4-butoxy) diphenyl silane
Example 12—tris (2-vinyl-1,3-dioxolane-4-butyl) citrate
Example 13—bis(2-vinyl-5-methyl-1,3 dioxan-5-yl)-methyll sebacate In each of these examples the cobalt butyl phthalate catalyst blends readily with the compound, and a substantially tack-free film is obtained in less time than is required with commonly used paint catalysts. For instance, in Examples 11 and 12, tack-free-time with the preferred catalyst is 17.5 hours, whereas tack-free-times of 89 and 42 hours respectively are obtained when cobalt linoleate is used as the catalyst.

The catalysts which are useful in practicing this invention are the cobalt(ous) salts of half esters of dibasic acids. These are exemplified by the following in addition to the one used for illustrative purposes in the examples: cobalt methyl adipate, cobalt ethyl sebacate, cobalt butyl succinate, cobalt butyl tetrahydrophthalate, and cobalt butyl chlorendate. All function substantially the same as cobalt butyl phthalate.

The catalyst is preferably dissolved in a volatile solvent, such as a volatile ketone, alcohol, or aromatic hydrocarbon prior to its incorporation into the polymerizable compound. However, the undissolved catalyst can also be mixed directly with the compound, especially when the latter is prewarmed. Having the catalyst predissolved not only results in a much faster rate of incorporation into the compound, but also facilitates the measurement of small amounts of the catalyst.

The best amount of catalyst for a given situation will depend to a large extent on the temperature of the air to which the layer of compound will be exposed during polymerization. When the air is at room temperature (about 75° F.) the cobalt metal content of the catalyst-compound mixture can be from about 0.01% to about 0.3% by weight of compound, preferably about 0.03% to 0.1%. If much less than 0.01% or much more than about 0.3% is used, the rate of polymerization may be undesirably slow.

When the air temperature during polymerization is about 100° C., tack-free films can be obtained in a relatively short time, say less than about 30 minutes, with a cobalt content of about 0.0005 to 0.005% by weight of compound. Greater amounts of catalyst can be used, but usually film distortion is encountered in such cases. Films containing less than 0.0005% catalyst tend to remain tacky. Only traces of catalyst are used at air temperatures as high as 200° C. One skilled in the art will readily arrive at the optimum proportion of catalyst to be used under a particular set of circumstances, as is commonly done with mixtures of ordinary catalysts and well-known film formers such as drying oil modified alkyds. It is usually advisable to apply films no thicker than about 5 mils so that the lower portion of the film will receive sufficient oxygen for polymerization. The films can be applied to various types of substrates, including metal, wood, paper and fabric.

Additional vinyl cyclic acetal compounds of the class specified for use in practicing this invention are disclosed in my copending patent applications S.N. 683,021, filed September 10, 1957, now abandoned; N.S. 730,070, filed April 22, 1958, now abandoned; S.N. 707,506, filed May 26, 1958; and S.N. 707,507, filed May 26, 1958.

In addition to the essential vinyl compound and catalyst, the polymerizable compositions of this invention can also contain various other film formers, such as vegetable oils, oil-modified alkyd resins, oleoresinous varnishes, synthetic thermoplastic and thermosetting resins. Various other well known coating composition additives or modifiers can also be included, such as plasticizers, solvents, pigments and stabilizers, by the methods and in the proportions commonly used in the coating art.

The method of this invention has the advantage of providing a desirable and consistent rate of polymerization for coatings or other thin bodies of the vinyl compounds. Favorable results are readily obtained at either room temperature or elevated temperatures.

The catalysts used are relatively odorless in contrast with the more common cobalt salt catalysts which are distinctly malodorous. Furthermore, the catalysts are readily introduced into the vinyl compounds, via volatile solvents or directly to form stable, homogeneous mixtures.

Many widely different embodiments of this invention can be made without departing from the spirit and scope thereof. Therefore, it is not intended to be limited except in accordance with the appended claims.

I claim:
1. A composition comprising a vinyl cyclic acetal compound and a catalytic amount of a cobalt(ous) salt of a half ester of a dicarboxylic acid, said compound containing a plurality of cyclic radicals having the following structural formula:

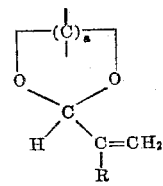

in which

represents carbon atoms in the ring, "$a$" being an integer having a value of at least 2, in which all but 1 of the valences of said carbon atoms are satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy, said interposed polyvalent radical being free of substituents having an inhibiting effect on the air-drying property of said compound.

2. A composition as defined in claim 1 in which said compound is bis(2-vinyl-1,3-dioxolane-4-butyl) ortho phthalate.

3. A composition as defined in claim 1 in which said compound is bis(2-vinyl-1,3-dioxolane-4-butyl) azo diformate.

4. A composition as defined in claim 1 in which said compound is bis(2-vinyl-1,3-dioxolane-4-butyl) itaconate.

5. A composition as defined in claim 1 in which said compound is bis(2-vinyl-1,3-dioxolane-4-butyl) acetone dicarboxylate.

6. A composition as defined in claim 1 in which said compound is bis(2-vinyl-1,3-dioxolane-4-butyl) acetamidomalonate.

7. A composition as defined in claim 1 in which said compound is bis(2-vinyl-1,3-dioxolane-4-butyl) di(cyanoethyl)malonate.

8. A composition as defined in claim 1 in which said compound is bis(2-vinyl-1,3-dioxolane-4-butoxy) diphenyl silane.

9. A composition as defined in claim 1 in which said compound is tris(2-vinyl-1,3-dioxolane-4-butyl) citrate.

10. A composition as defined in claim 1 in which said compound is bis[(2-vinyl-5-methyl-1,3-dioxan-5-yl)methyl] sebacate.

11. A composition as defined in claim 1 in which said salt is cobalt(ous) butyl phthalate.

12. A composition as defined in claim 1 in which said salt is present in the amount equal to about 0.0005% to 0.3% of cobalt metal by weight of said compound.

13. A composition as defined in claim 11 in which said salt is present in the amount equal to about 0.0005% to about 0.3% of cobalt metal by weight of said compound.

14. An article having a dry coating of a composition as defined in claim 1.

15. A method of polymerizing a vinyl cyclic acetal compound which comprises incorporating a catalytic amount of cobalt(ous) salt of a half ester of a dicarboxylic acid in said compound and exposing the resulting polymerizable composition to air, said compound containing a plurality of cyclic radicals having the following structural formula:

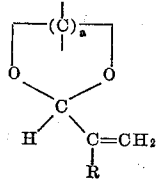

in which

represents carbon atoms in the ring, "$a$" being an integer having a value of at least 2, in which all but 1 of the valences of said carbon atoms are satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy, said interposed polyvalent radical being free of substituents having an inhibiting effect on the air-drying property of said compound.

16. A composition of claim 1 in which the substituents on said interposed polyvalent radical are selected from the class consisting of hydrogen and hydrocarbon radicals.

References Cited in the file of this patent

UNITED STATES PATENTS 2,401,776     Rothrock  --------------- June 11, 1946

OTHER REFERENCES

Chatfield: Varnish Substituents, pub. by Leonard Hill Limited, London, 1953, pages 543 and 544.